United States Patent
Shinjo et al.

(10) Patent No.: US 6,859,342 B1
(45) Date of Patent: Feb. 22, 2005

(54) MAGNETIC HEAD DEVICE WITH A SHORT AUXILIARY MEMBER

(75) Inventors: Yasuhiko Shinjo, Atsugi (JP); Morio Kondo, Atsugi (JP); Akira Nakamura, Atsugi (JP); Toshihiro Uehara, Tokyo (JP); Naoto Hayashi, Tokyo (JP); Kazutoshi Mutou, Tokyo (JP); Kenji Machida, Tokyo (JP); Junji Numazawa, Tokyo (JP)

(73) Assignees: Mitsumi Electric Co., Ltd., Tokyo (TW); Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/504,964

(22) Filed: Feb. 16, 2000

(30) Foreign Application Priority Data

Feb. 22, 1999 (JP) .......................................... 11-043677

(51) Int. Cl.[7] .............................................. G11B 5/187
(52) U.S. Cl. ..................................................... 360/122
(58) Field of Search ............................... 360/122, 125, 360/126, 127, 317, 318, 231

(56) References Cited

U.S. PATENT DOCUMENTS

| | | | | |
|---|---|---|---|---|
| 5,095,397 A | * | 3/1992 | Nagata et al. .............. 360/318 |
| 5,227,940 A | * | 7/1993 | Isomura et al. ............ 360/119 |
| 5,515,222 A | * | 5/1996 | Kumagai et al. ........... 360/122 |
| 5,586,385 A | | 12/1996 | Nishino et al. .......... 29/603.16 |
| 5,691,867 A | | 11/1997 | Onuma et al. .............. 360/126 |
| 5,694,277 A | * | 12/1997 | Lee ............................. 360/119 |
| 5,864,451 A | * | 1/1999 | Sato ........................... 360/119 |
| 5,896,253 A | * | 4/1999 | Dirne et al. ................. 360/122 |
| 6,038,106 A | * | 3/2000 | Aboaf et al. ................ 360/317 |
| 6,101,067 A | * | 8/2000 | Matsuzono et al. ........ 360/317 |
| 6,222,701 B1 | * | 4/2001 | Tamura et al. .............. 360/122 |

FOREIGN PATENT DOCUMENTS

| | | |
|---|---|---|
| JP | 6251329 | 9/1994 |
| JP | 6325322 | 11/1994 |
| JP | 922512 | 1/1997 |

* cited by examiner

*Primary Examiner*—Tianjie Chen
(74) *Attorney, Agent, or Firm*—Ladas & Parry LLP

(57) ABSTRACT

A magnetic head device having excellent sliding contact between its slider surface and magnetic tape at the time of scanning is provided. This magnetic head device has a base member, a thin-film magnetic head formed in contact with the base member and accommodated in a non-magnetic layer with the top end of a magnetic gap being exposed, and an auxiliary member which sandwiches the non-magnetic layer between the auxiliary member and the base member. On the top ends of the base member, the non-magnetic layer, and the auxiliary member, a slider surface on which magnetic tape slides is formed in the aligning direction of the base member, the non-magnetic layer, and the auxiliary member, or in a direction inclined at a predetermined angle to the aligning direction. Accordingly, the non-magnetic layer can be made thin, and the area of the non-magnetic layer on the slider surface is small. Thus, the space between the magnetic head device and the magnetic tape can be made small, and the sliding contact of the magnetic head device can be improved.

2 Claims, 7 Drawing Sheets

MAGNETIC HEAD DEVICE WITH A SHORT AUXILIARY MEMBER

BACKGROUND OF THE INVENTION

1. Field of the Invention

The present invention relates generally to magnetic head devices, and more particularly, to a magnetic head device that is attached to a rotary cylinder and helically scans magnetic tape in electronic equipment such as a video tape recorder.

In recent years, there has been an increasing demand for high-performance helical scan magnetic head devices, as a larger amount of digital image and audio data are expected to be recorded on magnetic tape at high density for high-quality reproduction.

2. Description of the Related Art

FIG. 1 is a perspective view of a conventional helical scan magnetic head device. In this figure, a magnetic head 10 has two magnetic head core parts (made of a magnetic material such as ferrite) 11 and 12 facing each other, and a gap 14 formed in the upper portion between the magnetic head core parts 11 and 12. Coils 18 are wound around coil guide grooves 15 and 16 and a coil opening 17 formed on the outer sides and at the center of the magnetic head core parts 11 and 12. Also, a slider surface 25 is formed on the top of the magnetic head core parts 11 and 12 by slide width restricting grooves 20 and 21. Non-magnetic mold glasses 22 and 23 are filled in the slider surface 25. The mold glasses 22 and 23 reinforce the exterior of the magnetic head 10 and forms the slider surface 25 on which magnetic tape slides. The mold glasses 22 and 23 also bond the two magnetic head core parts 11 and 12.

FIG. 2A is a plan view of the slider surface 25 of the conventional helical scan magnetic head device, and FIG. 2B is an enlarged view of the same slider surface 25. In the conventional helical scan magnetic head device, the slider surface 25 is defined by the slide width restricting grooves 20 and 21. However, the mold glasses 22 and 23 occupy a large area on the slider surface 25. Also, the abrasion resistance of the magnetic head core parts 11 and 12 is different from the abrasion resistance of the mold glasses 22 and 23. Since the mold glasses 22 and 23 have a large area on the slider surface 25, partial abrasion occurs between the magnetic head core parts 11 and 12 and the mold glasses 22 and 23 as the magnetic tape scanning time accumulates. This partial abrasion results in recession, which in turn leads to a wide space between the magnetic head and the magnetic tape at the time of scanning. Such a wide space results in poor sliding contact between the magnetic head and the magnetic tape.

SUMMARY OF THE INVENTION

Accordingly, it is an object of the present invention to provide a magnetic head device which has a smaller space between a magnetic head and magnetic tape so as to improve the sliding contact therebetween.

The above-described object of the present invention is achieved by a magnetic head device comprising:

a base member;

a thin-film magnetic head which is in contact with the base member and is accommodated in a non-magnetic layer, with a magnetic gap being exposed;

an auxiliary member which sandwiches the non-magnetic layer with the base member; and a slider surface on which magnetic tape slides in a first direction along which the base member, the non-magnetic layer, and the auxiliary member are arranged, or in a second direction which is inclined at a predetermined angle to the first direction.

According to the invention described above, the non-magnetic layer can be made thin, and the area of the non-magnetic layer on the slider surface can be small. With this structure, no recession is caused by tape sliding, and head-to-tape spacing can be small enough to obtain excellent sliding contact.

The above object of the present invention is also achieved by the magnetic head device described above, wherein the thin-film magnetic head is a magnetoresistive head. With the magnetoresistive head having a high sensitivity, enough output can be obtained by a small track width. Accordingly, the magnetic head device is compatible with high-density magnetic recording.

Additionally, the above object of the present invention is also achieved by the magnetic head device described above, wherein the non-magnetic layer on the slider surface has an area of 0.02 mm×0.08 mm or less. By making the area of the non-magnetic layer on the slider surface so small, the head-to-tape spacing becomes small enough to obtain improved sliding contact.

Other objects, features and advantages of the present invention will become more apparent from the following detailed description when read in conjunction with the accompanying drawings.

DESCRIPTION OF THE PREFERRED EMBODIMENTS

The following is a description of embodiments of the present invention, with reference to the accompanying drawings.

Figure 1:
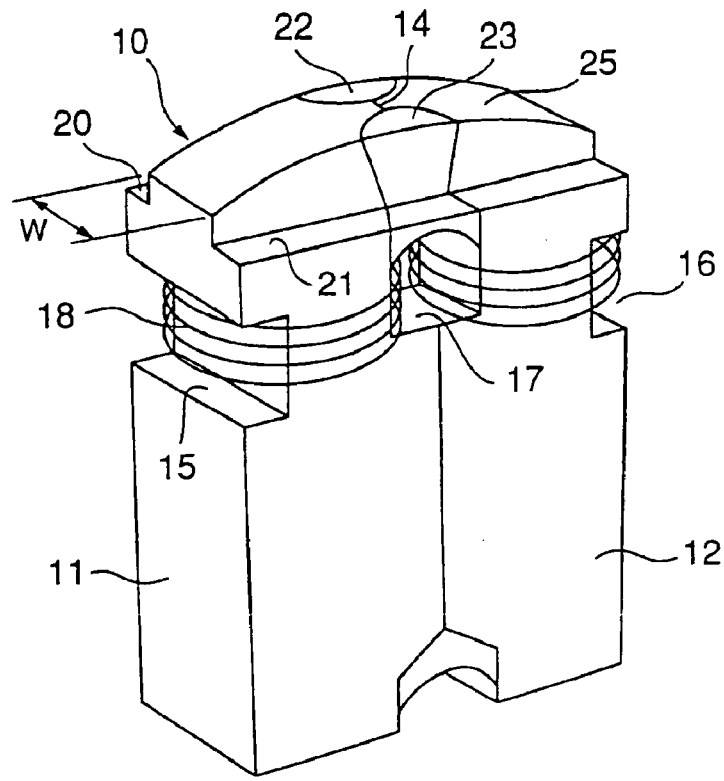
FIG. 1 is a perspective view of an embodiment of a helical scan magnetic head device of the prior art.
Figure 2A:
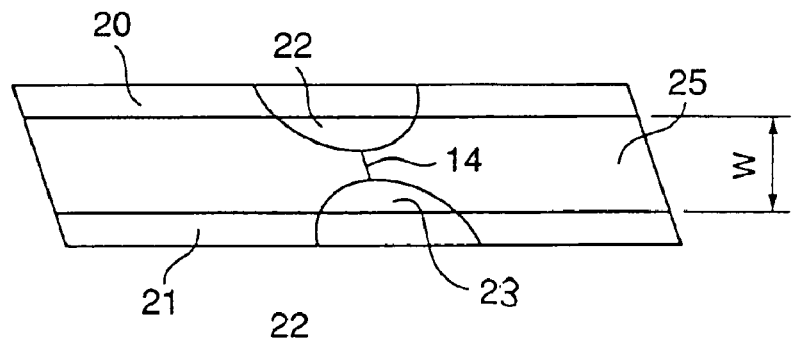
FIG. 2A is a plan view of a slider surface of the helical scan magnetic head device of the prior art.
Figure 2B:
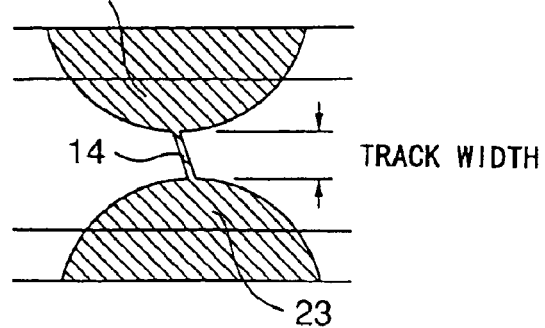
FIG. 2B is an enlarged view of the slider surface of the helical scan magnetic head device of the prior art.
Figure 3:
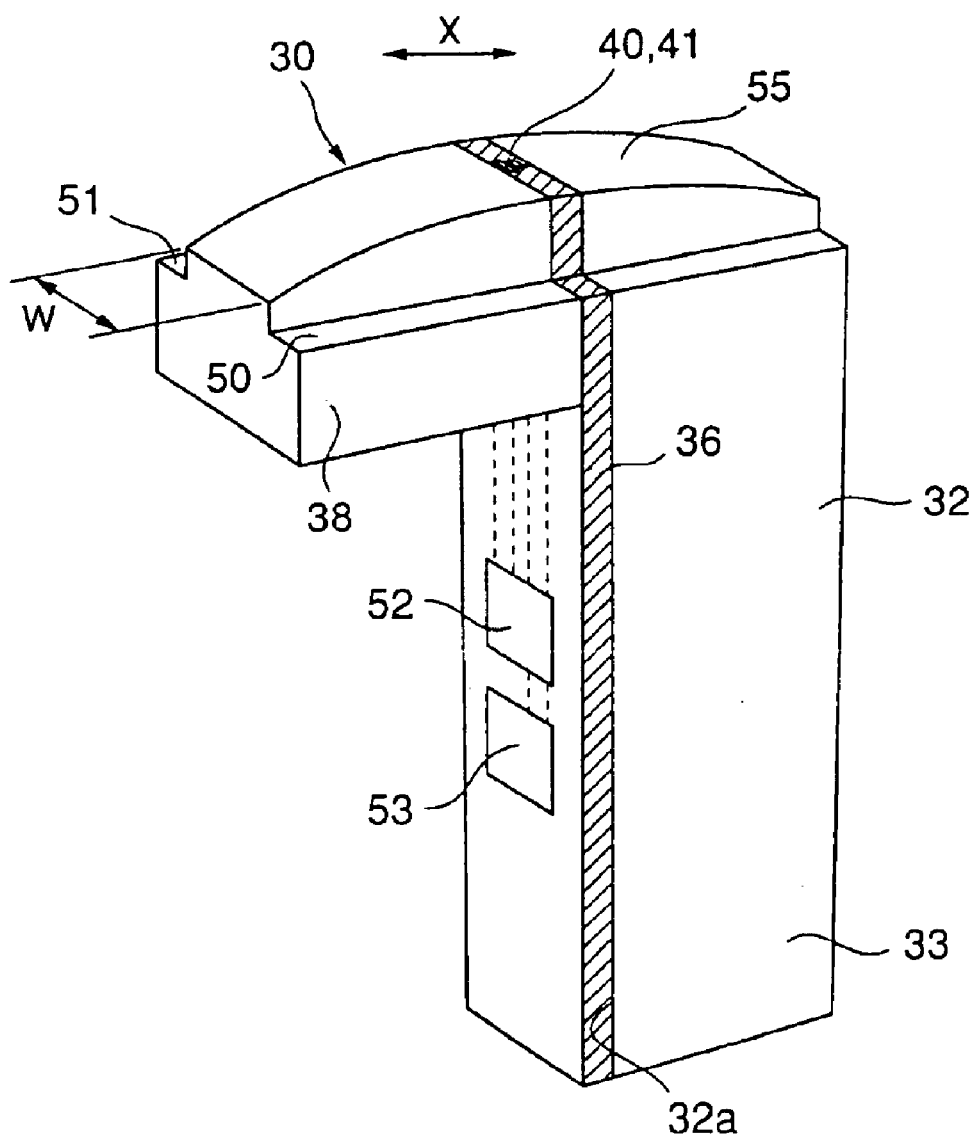
FIG. 3 is a perspective view of an embodiment of a magnetic head device of the present invention.
Figure 4A:
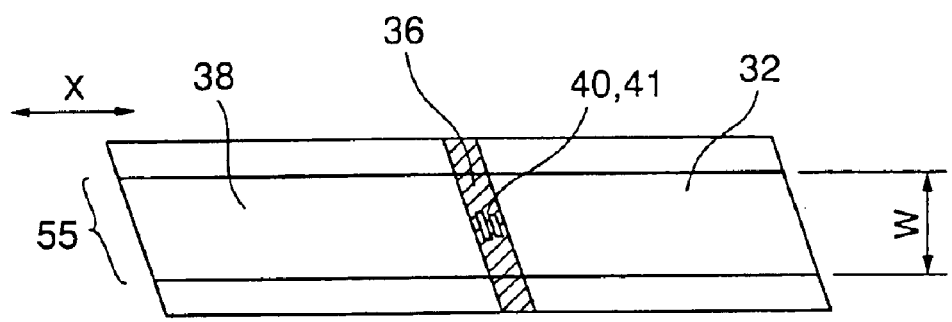
FIG. 4A is a plan view of a slider surface of the magnetic head device of the present invention.
Figure 4B:
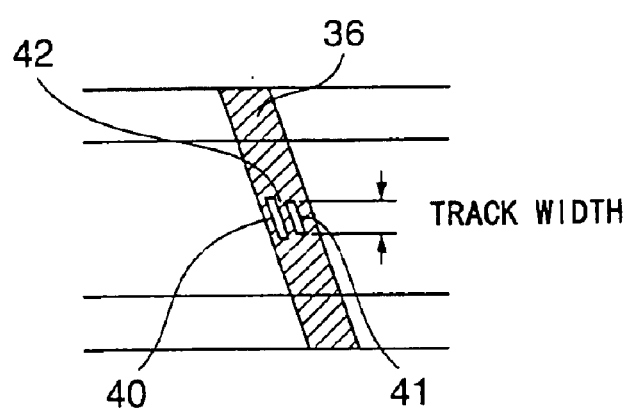
FIG. 4B is an enlarged view of the slider surface of the magnetic head device of the present invention.

FIG. 3 is a perspective view of an embodiment of a magnetic head device according to the present invention. FIGS. 4A and 4B are a plan view and an enlarged view, respectively, of the slider surface of the magnetic head device.

In FIG. 3, a magnetic head 30 comprises a base member 32 made of a non-magnetic material such as alumina-titanium carbide or a magnetic material, a non-magnetic insulating layer 36 formed on a surface 32a of the base member 32 and made of $Al_2O_3$ accommodating an MR (magnetoresistive) head, and an auxiliary member 38 bonded to the non-magnetic insulating layer 36 adjacent to the upper position of the base member 32 and made of the same non-magnetic material or magnetic material as the base member 32.

The MR head accommodated in the non-magnetic insulating layer 36 is a thin-layer magnetic head, and has a magnetic gap 42 between a lower yoke 40 and an upper yoke 41. As shown in FIGS. 4A and 4B, the lower yoke 40 and the upper yoke 41 are exposed through the non-magnetic insulating layer 36 at the top end of the magnetic head 30. Slider width restricting grooves 50 and 51 extend across the base member 32, the non-magnetic insulating layer 36, and the auxiliary member 38. The slide width W perpendicular to the tape running direction X is restricted to a predetermined width, for instance, 0.08 mm.

The top end surfaces of the base member 32, the non-magnetic insulating layer 36, and the auxiliary member 38 constitute a slider surface 55. Both front and rear portions along the tape running direction X of the slider surface 55 are curved so that the magnetic tape does not touch the front and rear portions of the slider surface 55 when the magnetic head 30 is helically scanning magnetic tape. The non-magnetic insulating layer 36 on the slider surface 55 is given an azimuth angle with respect to the running direction X. The magnetic gap 42 defined by the lower yoke 40 and the upper yoke 41 is situated in parallel with, that is given the same azimuth angle as, the non-magnetic insulating layer 36. It should be noted that giving the azimuth angle is not always necessary.

Figure 5:
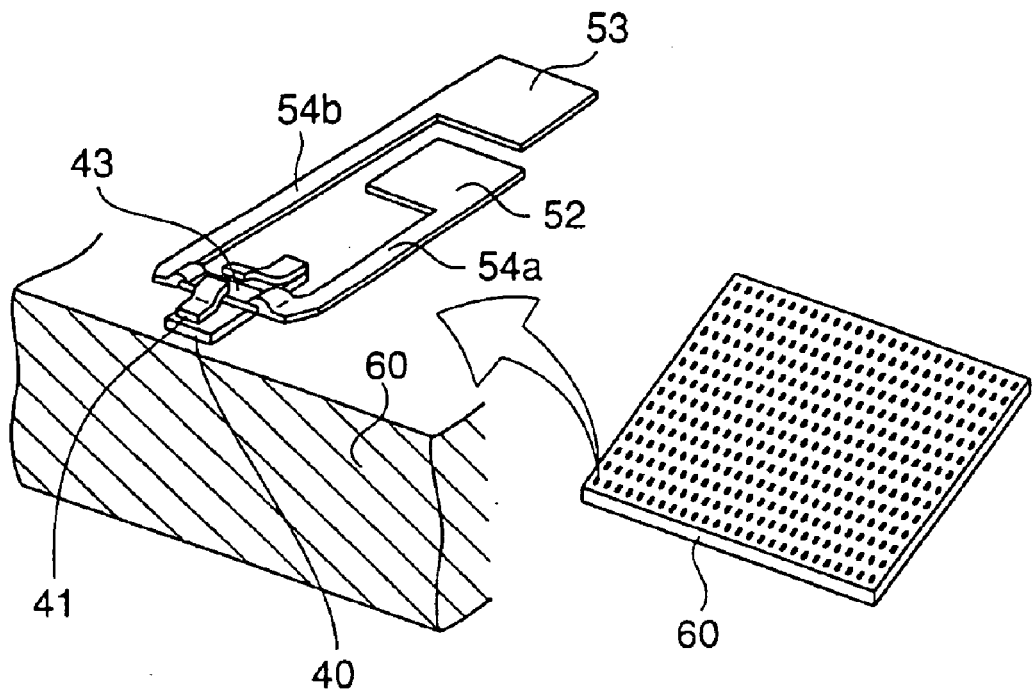
FIG. 5 is a perspective view showing a production procedure of one embodiment of the magnetic head device of the present invention.
Figure 6:
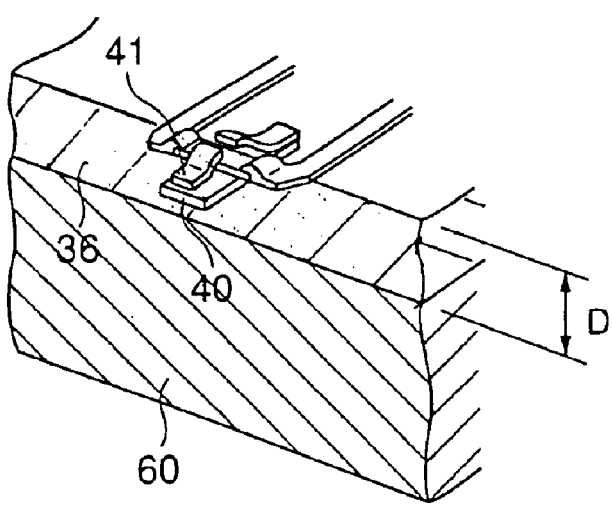
FIG. 6 is a perspective view showing production procedures of one embodiment of the magnetic head device of the present invention.

The non-magnetic insulating layer 36 has a thickness D, as shown in FIG. 6, of 0.02 mm in the tape running direction X. As shown in FIG. 5, electrode terminals 52 and 53 connected to both ends of MR element 43 of the MR head by metal wires are formed substantially in the center portion of the surface 32a of the base member 32. The electrode terminals 52 and 53 are exposed through the non-magnetic insulating layer 36. A lower portion 33 of the base member 32 is fixed to a rotary cylinder (not shown). Rotated by the rotary cylinder, the magnetic head 30 helically scans the magnetic tape.

FIGS. 5 to 12 illustrate production procedures of one embodiment of a magnetic head device of the present invention. In FIG. 5, the lower yoke 40, the MR element 7, 43, and the upper yoke 41 are formed on a substrate 60 made of a non-magnetic material such as alumina-titanium carbide or a magnetic material. Both ends of the MR element 43 are connected to the electrode terminals 52 and 53 by metal wires 54a and 54b. The MR head is arrayed on the substrate 60.

As shown in FIG. 6, an $Al_2O_3$ layer having a thickness D is formed on the substrate 60 by sputtering to form the non-magnetic insulating layer 36. The entire surface of the MR head is covered with and protected by the non-magnetic insulating layer 36. Bumps are then formed on the electrode terminals 52 and 53 by electrolytic plating, and the electrode terminals 52 and 53 are exposed by substrate grinding.

Figure 7:
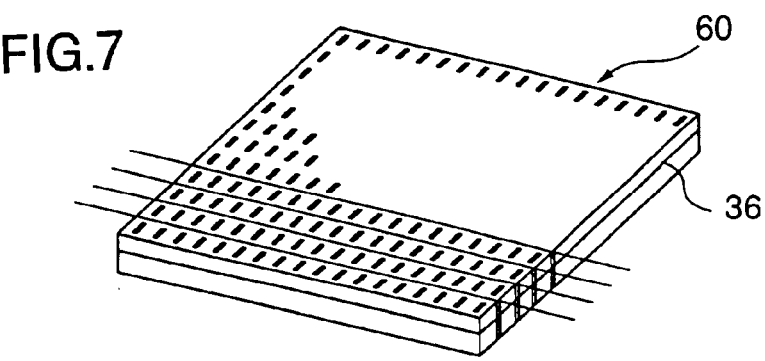
FIG. 7 is a perspective view showing production procedures of one embodiment of the magnetic head device of the present invention.
Figure 8:
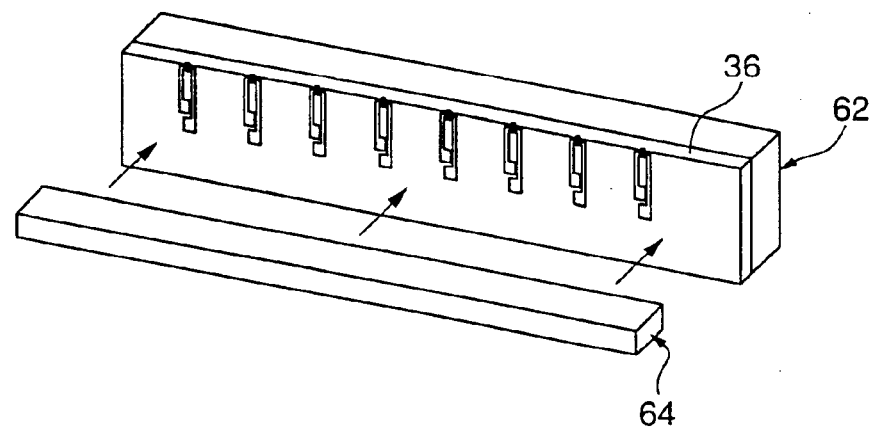
FIG. 8 is a perspective view showing production procedures of one embodiment of the magnetic head device of the present invention.
Figure 9:
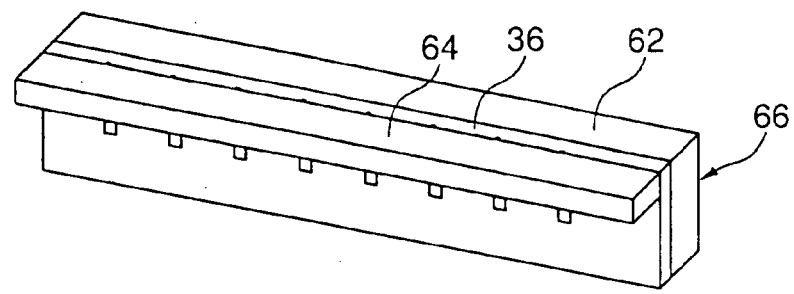
FIG. 9 is a perspective view showing production procedures of one embodiment of the magnetic head device of the present invention.

The substrate 60 is then sliced into rows, as shown by solid lines in FIG. 7, to obtain head forming blocks 62 shown in FIG. 8.

In each head forming block 62, the top of the magnetic gap 42 defined by the lower yoke 40 and the upper yoke 41 of each MR head are exposed on the sliced surface. An auxiliary block 64 made of the same non-magnetic material or magnetic material as the base member 32 is bonded to the non-magnetic insulating layer 36 on the head forming block 62. The auxiliary block 64 is produced independently of the substrate 60. At the time of bonding, the auxiliary block 64 is placed on the magnetic gap exposed surface of the head forming block 62 to obtain a joint block 66 shown in FIG. 9.

Figure 10:
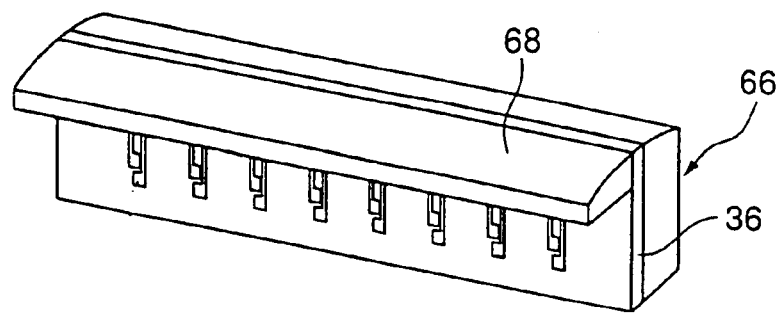
FIG. 10 is a perspective view showing production procedures of one embodiment of the magnetic head device of the present invention.
Figure 11:
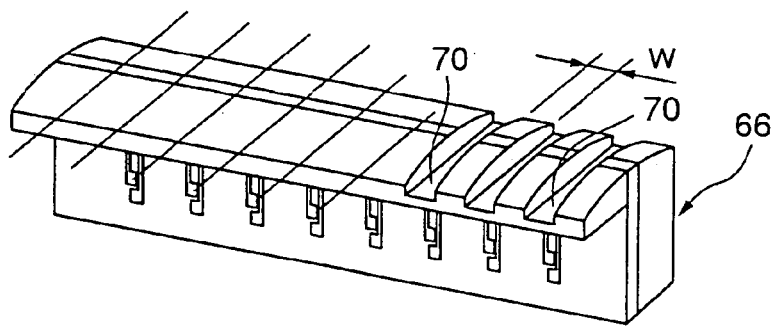
FIG. 11 is a perspective view showing production procedures of one embodiment of the magnetic head device of the present invention.
Figure 12:
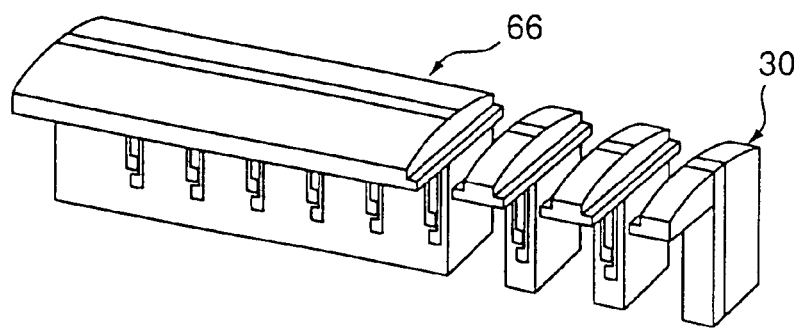
FIG. 12 is a perspective view showing production procedures of one embodiment of the magnetic head device of the present invention.

The upper surface of the joint block 66 is curved, as shown in FIG. 10, to form a curved surface that is the slider surface 55. Grooves 70 are then formed as shown in FIG. 11, leaving the width W between each two MR heads of the joint block 66. The joint block 66 is then sliced at the center of each of the grooves 70 to obtain a plurality of magnetic heads 30. The divided grooves 70 form the slide width restricting grooves 50 and 51 of the magnetic heads 30.

Figure 13A:
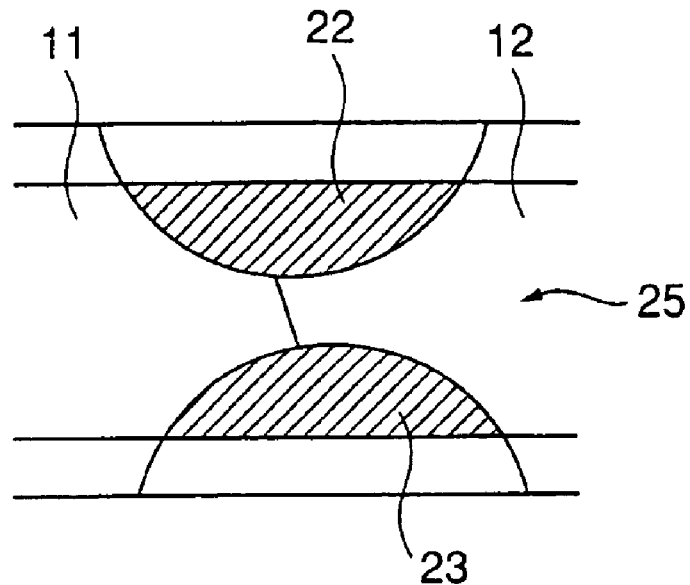
FIG. 13A is a plan view of the slider surface of the conventional magnetic head device.
Figure 13B:
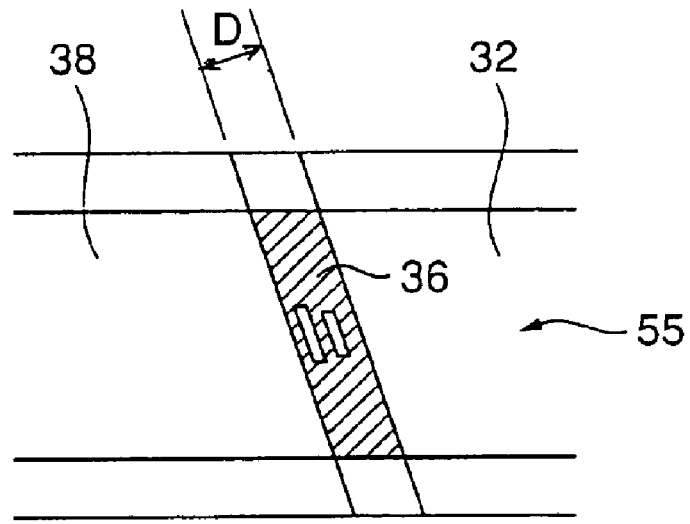
FIG. 13B is a plan view of the slider surface of the magnetic head device of the present invention.

In the magnetic head 10 of the prior art, the mold glasses 22 and 23 made of a different material from the magnetic head core parts 11 and 12 occupy a large area on the slider surface 25, as shown in FIG. 13A. In the magnetic head 30 of the present invention, on the other hand, the non-magnetic insulating layer 36 has a small thickness D of 0.02 mm. Accordingly, the non-magnetic insulating layer 36 made of a different material from the base member 32 and the auxiliary member 38 has a considerably smaller area of 0.02 mm×0.08 mm or less. As a result, recession caused by partial abrasion between the base member 32, the auxiliary member 38, and the non-magnetic insulating layer 36 is small, and so is the head-to-tape spacing at the time of scanning. Thus, improved sliding contact can be obtained between the magnetic head and the magnetic tape.

The above description is provided in order to enable any person skilled in the art to make and use the invention and sets forth the best mode contemplated by the inventors for carrying out the invention.

The present invention is not limited to the specifically disclosed embodiments and variations, and modifications may be made without departing from the scope of the present invention.

What is claimed is:

1. A magnetic head device comprising:
   a base member made of a non-magnetic material;
   a thin-film magnetic head, which is in contact with the base member and is accommodated in a single non-magnetic layer, and which thin-film magnetic head comprises a lower yoke, a magnetoresistive element, an upper yoke, and electrode terminals;
   an auxiliary member made of a non-magnetic material which sandwiches the single non-magnetic layer between the auxiliary member and the base member, wherein lengths of the auxiliary member and the base member in a magnetic tape running direction are the same; and a slider surface on which magnetic tape slides in one of a first direction along which the base member, the non-magnetic layer, and the auxiliary member are arranged, and a second direction which is inclined at a predetermined angle relative to the first direction, wherein a magnetic gap is exposed on the slider surface between the ends of the upper and lower yokes that are situated in parallel with each other on the slider surface, and wherein each upper surface of the base member and the auxiliary member is curved so as to form the slider surface wherein the length of the auxiliary member in a direction perpendicular to the slider surface is shorter than the length of the base member in the direction perpendicular to the slider surface, and the auxiliary member is bonded to the single non-magnetic layer at an upper position of the base member such that the electrode terminals are exposed through the single non-magnetic layer, wherein the exposed electrode terminals are arranged in the direction perpendicular to the slider surface.

2. The magnetic head device as claimed in claim 1, wherein the non-magnetic layer on the slider surface has an area of 0.02 mm×0.08 mm or less.

* * * * *